United States Patent
Misawa

(10) Patent No.: US 11,736,652 B2
(45) Date of Patent: Aug. 22, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Reiji Misawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/390,341

(22) Filed: Jul. 30, 2021

(65) Prior Publication Data

US 2022/0046145 A1 Feb. 10, 2022

(30) Foreign Application Priority Data

Aug. 6, 2020 (JP) .................................. 2020-133793

(51) Int. Cl.
*H04N 1/62* (2006.01)
*H04N 1/58* (2006.01)

(52) U.S. Cl.
CPC .................. *H04N 1/62* (2013.01); *H04N 1/58* (2013.01); *H04N 2201/0094* (2013.01)

(58) Field of Classification Search
CPC ..... H04N 1/62; H04N 1/58; H04N 2201/0094
USPC .......................................... 358/2.1, 1.9, 1.15
See application file for complete search history.

(56) References Cited

U.S. PATENT DOCUMENTS

| 5,418,574 | A | * | 5/1995 | Miyabata | H04N 1/58 348/625 |
| 2003/0179419 | A1 | * | 9/2003 | Abe | H04N 1/32358 358/474 |
| 2008/0106569 | A1 | * | 5/2008 | Suwa | H04N 1/58 347/19 |
| 2014/0010442 | A1 | * | 1/2014 | Kato | H04N 1/193 382/164 |

FOREIGN PATENT DOCUMENTS

JP 2003309727 A 10/2003

* cited by examiner

*Primary Examiner* — Quang N Vo
(74) *Attorney, Agent, or Firm* — Canon U.S.A., Inc. IP Division

(57) ABSTRACT

An apparatus includes, a change unit configured to change a pixel value of an edge pixel indicating an edge portion of an image based on the image data having the quantized color, wherein, in a case where the pixel value of the edge pixel is a pixel value changed by color reduction processing to decrease a luminance, the change unit changes the pixel value of the edge pixel to a pixel value of a pixel having a highest luminance among pixels surrounding the edge pixel, and wherein, in a case where the pixel value of the edge pixel is a pixel value changed by the color reduction processing to increase a luminance, the change unit changes the pixel value of the edge pixel to a pixel value of a pixel having a lowest luminance among pixels surrounding the edge pixel.

18 Claims, 11 Drawing Sheets

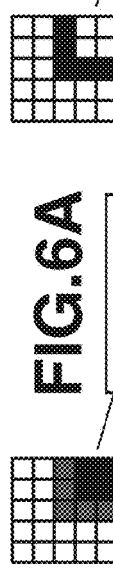
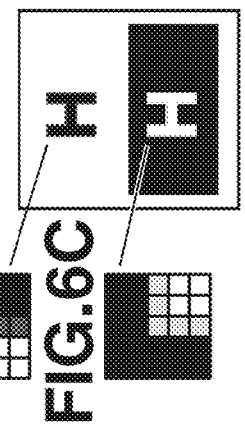
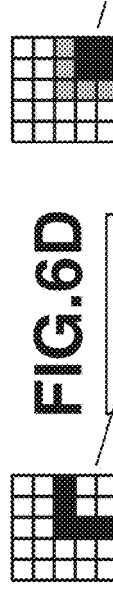
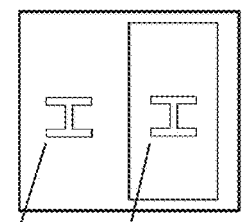
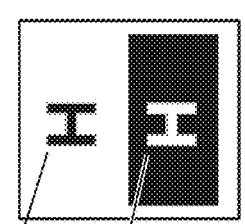
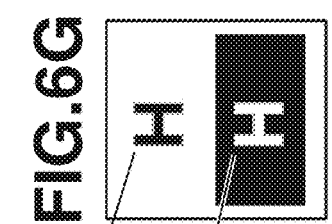
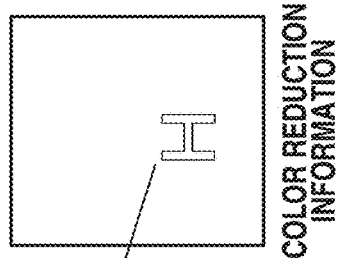
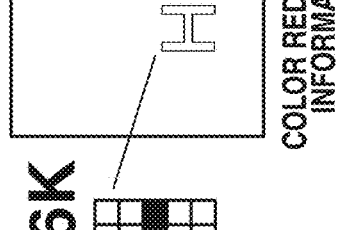
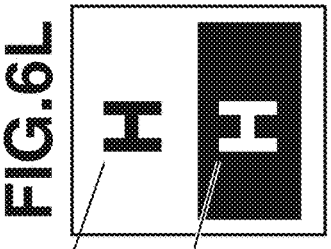

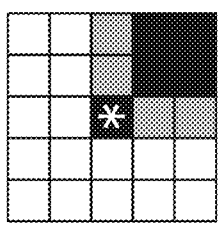
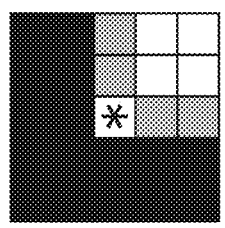
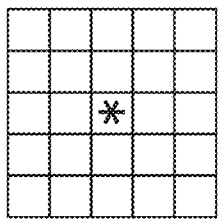
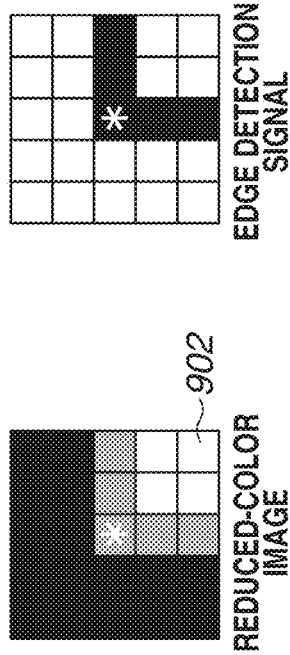
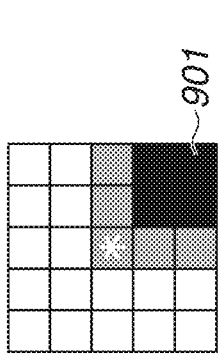

IMAGE PROCESSING APPARATUS, IMAGE PROCESSING METHOD, AND STORAGE MEDIUM

BACKGROUND OF THE DISCLOSURE

Field of the Disclosure

The aspect of the embodiments relates to an image processing apparatus, an image processing method, and a storage medium.

Description of the Related Art

In Japanese Patent Application Laid-Open No. 2003-309727, color reduction processing is performed on an original image, color information and an index color image are thereby output, and a binary image for each color and background color information are generated therefrom to perform compression processing using a method such as a Modified Modified READ (MMR).

When an original document is scanned and image data is generated, an intermediate color can appear at a character edge portion of the image data for a reason such as uneven scanning In a case where this image data is processed in the manner discussed in Japanese Patent Application Laid-Open No. 2003-309727, i.e., in a case where the color reduction processing is performed on this image data, and a binary image for each color is thereby generated and subjected to the compression processing using the method such as MMR, the generated binary image has a character portion and a character edge portion that vary in color. In such a case, compression efficiency decreases when the binary image is compressed by the method such as MMR.

Here, it is conceivable that the compression efficiency may be improved by performing edge detection from a scanned image, and reducing an intermediate color of a character edge portion by changing the intermediate color of the edge portion to a representative color selected from non-edge pixels. However, if an intermediate color of an edge portion of a non-open character and an intermediate color of an edge portion of an open character are the same color, and the colors of the respective edge portions are changed to the same representative color, the following issue arises. For example, in a case where the color of the edge portion of the non-open character is changed to the color of this character, the color of the edge portion of the open character is changed to the color of the background of the character, so that the open character becomes thinner, which can reduce readability. In a case where the color of the edge portion of the open character is changed to the color of the open character, the color of the edge portion of the non-open character is changed to a color same as the color of the background of the non-open character, so that the non-open character becomes thinner, which can reduce readability.

SUMMARY OF THE DISCLOSURE

According to an aspect of the embodiments, an apparatus includes a reading unit configured to read an image of an original document and generate image data, a reduction unit configured to execute color reduction processing of quantizing color of the generated image data, and a change unit configured to change a pixel value of an edge pixel indicating an edge portion of an image based on the image data having the quantized color, wherein, in a case where the pixel value of the edge pixel is a pixel value changed by the color reduction processing to decrease a luminance, the change unit changes the pixel value of the edge pixel to a pixel value of a pixel having a highest luminance among pixels surrounding the edge pixel, and wherein, in a case where the pixel value of the edge pixel is a pixel value changed by the color reduction processing to increase a luminance, the change unit changes the pixel value of the edge pixel to a pixel value of a pixel having a lowest luminance among pixels surrounding the edge pixel.

Further features of the disclosure will become apparent from the following description of exemplary embodiments with reference to the attached drawings.

BRIEF DESCRIPTION OF THE DRAWINGS

FIGS. 6A to 6N are diagrams illustrating image data according to the first exemplary embodiment.

FIGS. 9A to 9H are diagrams illustrating the processing performed in the edge pixel color correction unit according to the first exemplary embodiment.

DESCRIPTION OF THE EMBODIMENTS

Exemplary embodiments of the disclosure will be described below with reference to the drawings.

Entire System Configuration

Figure 1:
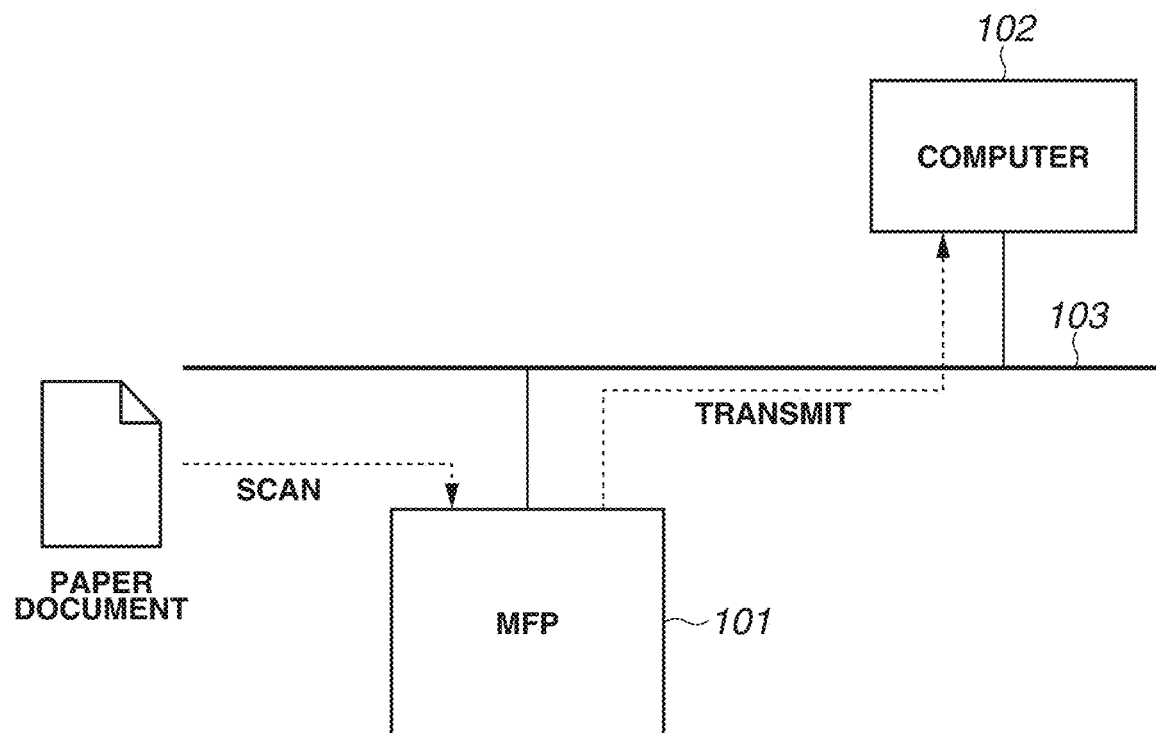
FIG. 1 is a block diagram illustrating an apparatus according to a first exemplary embodiment.

FIG. 1 is a schematic diagram illustrating a system configuration of a multi-function peripheral (MFP) according to a first exemplary embodiment. In FIG. 1, an MFP 101 and a computer (hereinafter, a personal computer (PC)) 102 are connected via a network 103.

A user can set a destination (e.g., the PC 102) for transmission of a scanned image and make various settings related to scanning and transmission, using an operation unit 203 (see FIG. 2) of the MFP 101 to be described below. As the various settings, the user can designate a resolution, a compression rate, a data format (e.g., Joint Photographic Experts Group (JPEG), Tag Image File Format (TIFF), Portable Document Format (PDF), small-number-of-colors compression, or small-number-of-colors compression (with optical character recognition (OCR) results)), etc. In the present exemplary embodiment, a case where the small-number-of-colors compression is designated as the data format will be described. The technical details of the small-number-of-colors compression will be described below. Afterward, based on the designated various settings, data is generated using software or a hardware function of the MFP 101, and the generated data is transmitted to the designated destination. Here, the image to be transmitted to the PC 102 is transmitted in a file format such as PDF, and thus can be viewed with a general-purpose viewer included in the PC 102.

MFP System Configuration

Figure 2:
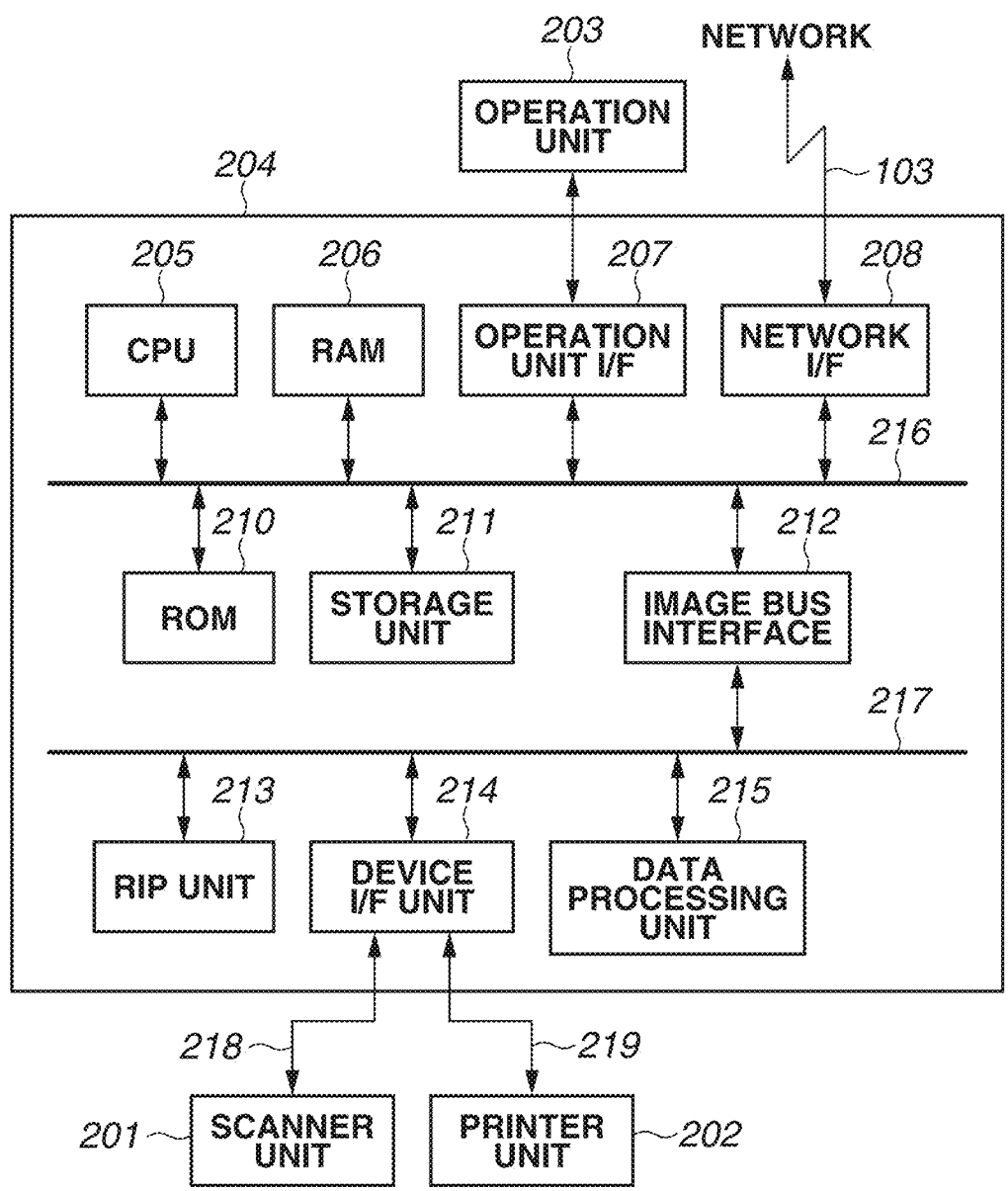
FIG. 2 illustrates a hardware configuration of a multi-function peripheral (MFP) according to the first exemplary embodiment.

FIG. 2 is a diagram illustrating a detailed configuration of the MFP 101 according to the present exemplary embodiment.

The MFP 101 includes a scanner unit 201 that is an image input device, a printer unit 202 that is an image output device, a control unit 204 including a memory, and the operation unit 203 that is a user interface (UI). The control unit 204 is a controller that connects to the scanner unit 201, the printer unit 202, and the operation unit 203, and also connects to the network 103, thereby inputting and outputting image information and device information. A central processing unit (CPU) 205 is a processor that controls the entire system. A random access memory (RAM) 206 is a system work memory for the CPU 205 to operate, and is also an image memory for temporarily storing image data. A read only memory (ROM) 210 is a boot ROM, and stores programs such as a boot program of the system. A storage unit 211 is a hard disk drive and stores system control software and image data. An operation unit interface (I/F) 207 is an interface with the operation unit 203, and outputs image data to be displayed on the operation unit 203 (UI) to the operation unit 203. The operation unit I/F 207 also has a role of conveying information input by the user of the MFP 101 from the operation unit 203 to the CPU 205. A network I/F 208 connects the MFP 101 to the network 103, and inputs/outputs information in a packet format. The above-described devices are on a system bus 216. An image bus interface 212 is a bus bridge that connects the system bus 216 and an image bus 217 for transferring image data at high speed, and converts a data structure. The image bus 217 consists of, for example, a Peripheral Component Interconnect (PCI) bus or an Institute of Electrical and Electronic Engineers (IEEE) 1394 bus.

The following devices are on the image bus 217. A raster image processor (RIP) unit 213 analyzes a page description language (PDL) code and rasterizes it into a bitmap image with the designated resolution, i.e., implements so-called rendering processing. A device I/F unit 214 connects the scanner unit 201 that is the image input device via a signal line 218, and connects the printer unit 202 that is the image output device via a signal line 219. A data processing unit 215 performs image processing for scan data input from the scanner unit 201, data processing for a print image to be output to the printer unit 202, and processing such as the small-number-of-colors compression and OCR. Compressed data 317 to be described below is thereby generated. The generated compressed data 317 is transmitted to the designated destination (e.g., the PC 102) via the network I/F 208 and the network 103. The data processing unit 215 can also decompress compressed data received via the network I/F 208 and the network 103. An image generated by the decompression is transmitted to the printer unit 202 via the device I/F unit 214 and then printed. The data processing unit 215 will be described in detail below.

Description of Data Processing Unit

Figure 3:
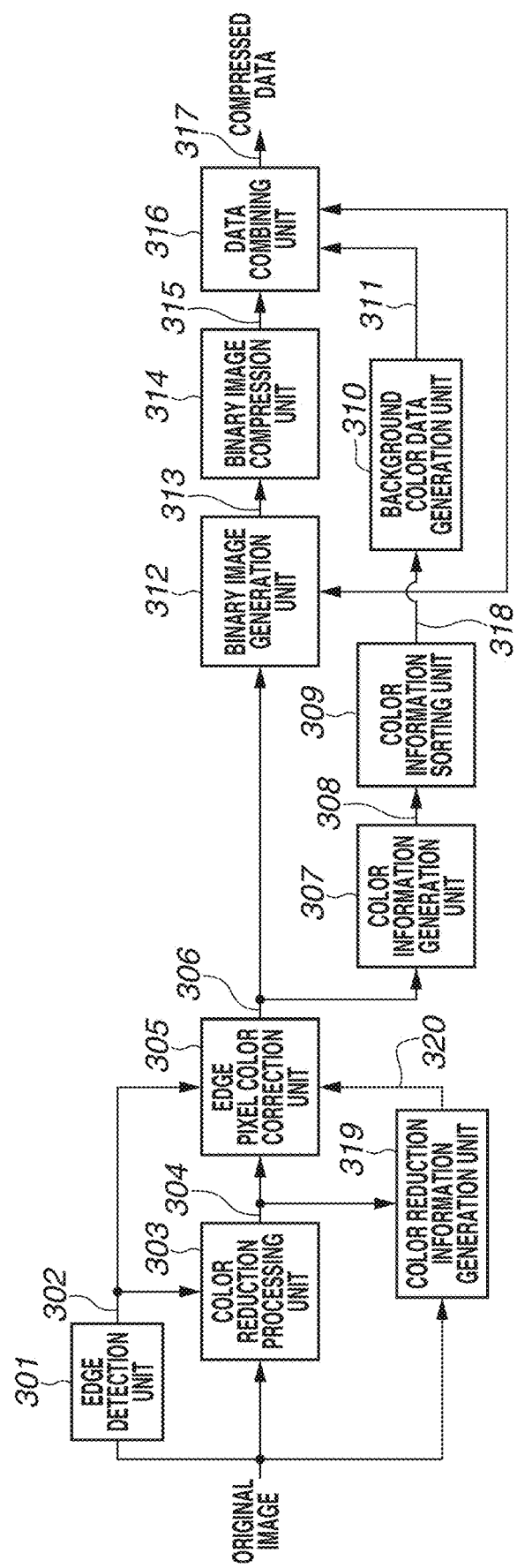
FIG. 3 is a diagram illustrating details of a data processing unit according to the first exemplary embodiment.

FIG. 3 illustrates a functional arrangement of an image encoding apparatus in the present exemplary embodiment, and data processed by each unit.

Here, an example of an original image in the present exemplary embodiment is illustrated in FIG. 6A. FIG. 6A is a schematic diagram illustrating an image including a black character "H" and an open (white) reversed character "H", as an original image. The reversed character is a character having a feature of a higher luminance than a background, as represented by an open character.

FIG. 6B is an enlarged diagram of an upper left part of the character in FIG. 6A, and illustrates that an edge portion of the character is dark gray because of uneven reading. FIG. 6C is an enlarged diagram of an upper left part of the reversed character, and illustrates that an edge portion is light gray because of uneven reading likewise. Brightness and RGB values including those of gray to be described below are arranged in ascending order of luminance as follows: black (0,0,0), dark gray (64,64,64), gray (128,128,128), light gray (192,192,192), and white (255,255,255). The present exemplary embodiment is described using characters of achromatic color such as a black character and an open reversed character, but characters of chromatic color such as a red character and a blue character may be used. An edge detection unit 301 performs edge detection for each pixel of the original image. A conventional technology such as a Laplacian filter or a Canny method is used as a technique for the edge detection. As a result of performing the edge detection processing, an edge detection signal 302 corresponding to each pixel of the original image is generated. The edge detection signal 302 is, for example, a binary image of the same size as the original image, and is a value of 0 or 1 corresponding to the edge detection result of each pixel of the original image (0 indicates non-edge, and 1 indicates edge). Here, FIG. 6D illustrates an example of the edge detection signal 302 in the present exemplary embodiment. FIG. 6E is an enlarged diagram of an upper left part of the character in FIG. 6D. FIG. 6F is an enlarged diagram of an upper left part of the reversed character. As illustrated in FIGS. 6E and 6F, the edge detection is performed for both of the character and the reversed character in the same manner A color reduction processing unit 303 executes color reduction processing, based on the number of colors predetermined for the original image, and the edge detection signal 302. In the present exemplary embodiment, a reduced-color image 304 is generated using information representing the color of a pixel determined to have a value of 0, i.e., determined to be non-edge, of the edge detection signal 302, corresponding to each pixel of the original image. As the predetermined number of colors, a value stored in the ROM 210 is used in the present exemplary embodiment, but the predetermined number of colors is not limited thereto. In the color reduction method, for example, a representative color after color reduction is performed is determined by selecting the predetermined number of colors from frequently appearing colors in a histogram of the RGB values. Afterward, for each of all the pixels in the image, the color reduction is performed to change the color to a color closest to the representative color. This is a technique for the description in the present exemplary embodiment, and the color reduction method is not limited thereto. This color reduction processing is processing of quantizing color included in the image data.

Here, FIG. 6G illustrates an example of the reduced-color image 304 in the present exemplary embodiment. FIG. 6H is an enlarged diagram of an upper left part of the character in FIG. 6G, and FIG. 6I is an enlarged diagram of an upper left part of the reversed character. An edge portion of the character and an edge portion of the reversed character are both the same gray. For this reason, if the edge portion of the character and the edge portion of the reversed character are both corrected to black, there arises such an issue that the reversed character is squished and readability thereby declines. In one embodiment, the edge portion of the character and the edge portion of the reversed character are separated subjected to edge pixel color correction.

Therefore, in the present exemplary embodiment, color reduction information indicating whether the color reduction is performed to make a change to a lower luminance or to a higher luminance is used. For example, the edge portion of the character in FIG. 6H indicates that the color reduction is performed to change a dark gray pixel of the original image in FIG. 6B to a gray pixel having a high luminance. Further, the edge portion of the reversed character in FIG. 6I indicates that the color reduction is performed to change a light gray pixel of the original image in FIG. 6C to a gray pixel having a low luminance. A color reduction information generation unit 319 uses the original image and the reduced-color image 304 as input, compares pixels at the corresponding positions of the respective images, and generates the color reduction information 320 indicating whether the color reduction is performed to make a change to a lower luminance or to a higher luminance. Here, the color reduction information 320 assumes 1 in a case where a luminance of the reduced-color image is lower than that of the original image, and assumes 0 in a case where a luminance of the reduced-color image is higher than or equal to that of the original image.

Here, FIG. 6J illustrates an example of the color reduction information 320 in the present exemplary embodiment.

FIG. 6K is an enlarged diagram of an upper left part of the reversed character in FIG. 6J, and illustrates that the edge portion of the reversed character is a region where the luminance of the reduced-color image is lower than that of the original image. In other words, the luminance of the edge portion of the reversed character is reduced by the color reduction processing. In the remaining region, the luminance of the reduced-color image is higher than or equal to that of the original image. In the present exemplary embodiment, to simplify the description, the region where the luminance of the reduced-color image is lower than that of the original image is the edge portion of the reversed character, but, actually, such a region can be not the edge portion of the reversed character but also the edge portion of the character, because of an influence of uneven reading or the like. Further, in the edge portion of the reversed character as well, the luminance of the reduced-color image can be higher than that of the original image. An edge pixel color correction unit 305 uses the edge detection signal 302, the reduced-color image 304, and the color reduction information 320 as input, and corrects the pixel value (color) of a pixel subjected to the edge determination, based on the color reduction information 320 and the pixel values (colors) of surrounding pixels.

Here, FIG. 6L illustrates an example of an edge pixel color correction image 306 in the present exemplary embodiment. FIG. 6M is an enlarged diagram of an upper left part of the character in FIG. 6L, and FIG. 6N is an enlarged diagram of an upper left part of the reversed character. As illustrated in FIGS. 6M and 6N, a gray halftone in each of FIGS. 6H and 6I is reduced, so that compression efficiency can be improved.

The edge pixel color correction processing will be described with reference to FIGS. 9A to 9H. In the present exemplary embodiment, a region of 5×5 pixels with a target pixel indicated by "*" centered is used as a reference region, but the reference region is not limited thereto, and a region of 7×7 pixels or a region of 9×9 pixels may be used as the reference region.

FIGS. 9A and 9B each illustrate the reduced-color image 304, and are similar to FIGS. 6H and 6I described above. FIG. 9C and FIG. 9D each illustrate the edge detection signal 302, and are similar to FIGS. 6E and 6F described above. FIGS. 9E and 9F each illustrate the color reduction information 320, and FIG. 9E illustrates the color reduction information 320 corresponding to FIG. 9A in terms of position, while FIG. 9F is similar to FIG. 6K.

First, when receiving the reduced-color image 304 in each of FIG. 9A and FIG. 9B as input, the edge pixel color correction unit 305 refers to the edge detection signal 302 in each of FIG. 9C and FIG. 9D, and refers to the color reduction information 320 in each of FIG. 9E and FIG. 9F for the edge pixel.

Here, if the color reduction information 320 is "0", i.e., the pixel of the reduced-color image has a luminance higher than that of the pixel of the original image, the edge pixel color correction unit 305 selects a pixel having the lowest luminance from 5×5 pixels, specifically, from 24 pixels except for the target pixel, and corrects the color of the target pixel to the color of the selected pixel.

In a case where the pixel having the lowest luminance is a pixel 901, i.e., a black pixel, in FIG. 9A, gray of the target pixel is corrected to black. FIG. 9G illustrates the result of the edge pixel color correction of the target pixel in FIG. 9A.

Further, if the color reduction information 320 is "1", i.e., the pixel of the reduced-color image has a luminance lower than that of the pixel of the original image, the edge pixel color correction unit 305 selects a pixel having the highest luminance from 5×5 pixels, specifically, from 24 pixels except for the target pixel, and corrects the color of the target pixel to the color of the selected pixel.

In a case where the pixel having the highest luminance is a pixel 902, i.e., a white pixel, in FIG. 9B, gray of the target pixel is corrected to white. FIG. 9H illustrates the result of the edge pixel color correction of the target pixel in FIG. 9B.

As a result of thus performing the edge pixel color correction processing, the edge pixel color correction image 306 is generated. This can realize an improvement in compression efficiency and compression with satisfactory reproducibility in a binary image compression unit 314 to be described below.

Figure 10A:
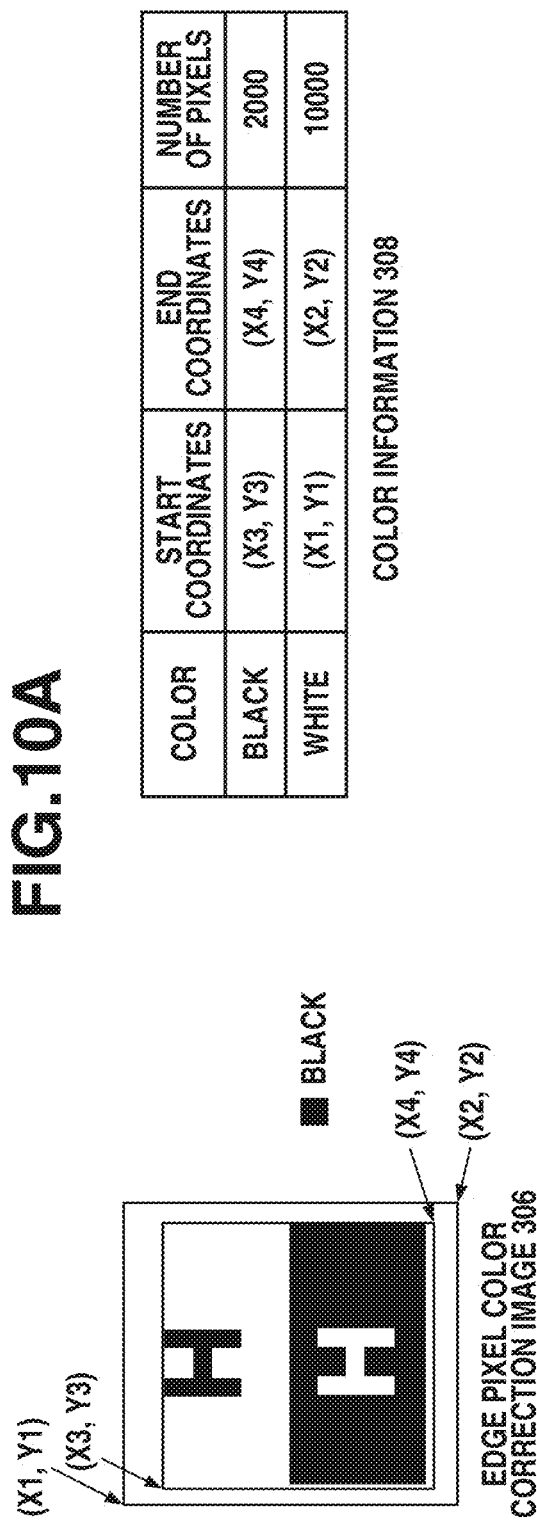
FIGS. 10A and 10B are diagrams illustrating processing by a color information generation unit and a color information sorting unit according to the first exemplary embodiment.
Figure 10B:
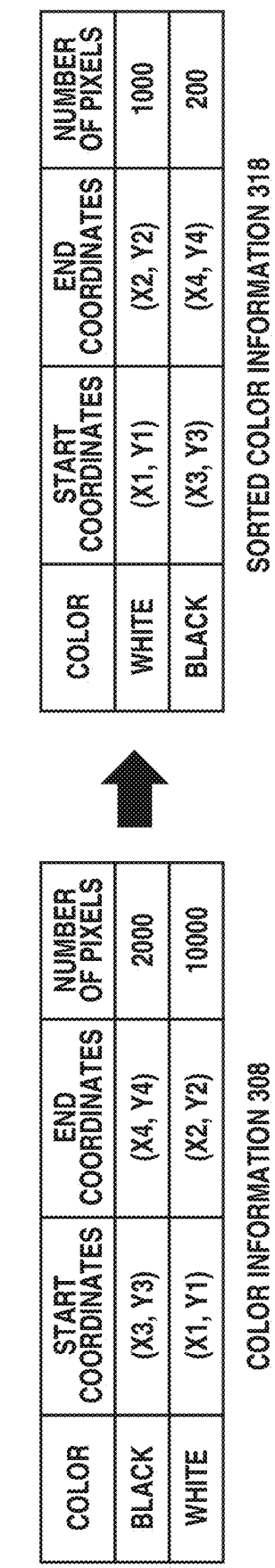

A color information generation unit 307, color information 308, and a color information sorting unit 309 will be described with reference to FIGS. 10A and 10B. The color information generation unit 307 generates the color information 308 for each color included in the edge pixel color correction image 306 generated in the edge pixel color correction unit 305. Specifically, the color information generation unit 307 generates the color information 308 consisting of data representing the number of pixels having that color, the value of the color, and a distribution range representing which range in the entire image includes a pixel having that color in the image, as illustrated in FIG. 10A. Therefore, the color information is generated for the number of colors used in the edge pixel color correction image 306. The data of the distribution range is data of the coordinates (start coordinates) of a pixel at the upper left corner and the coordinates (end coordinates) of a pixel at the lower right corner, for each color in the edge pixel color correction image 306. The color information sorting unit 309 sorts the color information 308 by the number of pixels for each color, and generates sorted color information 318 illustrated in FIG. 10B. Color information corresponding to the largest number of pixels thereby appears at the top of the sorted color information 318. A background color data generation unit 310 generates the value of the color included in the color information at the top of the sorted color information 318, as background color data 311. In the present exemplary embodiment, this value is a RGB 8-bit value, but is not limited thereto.

Figure 4:
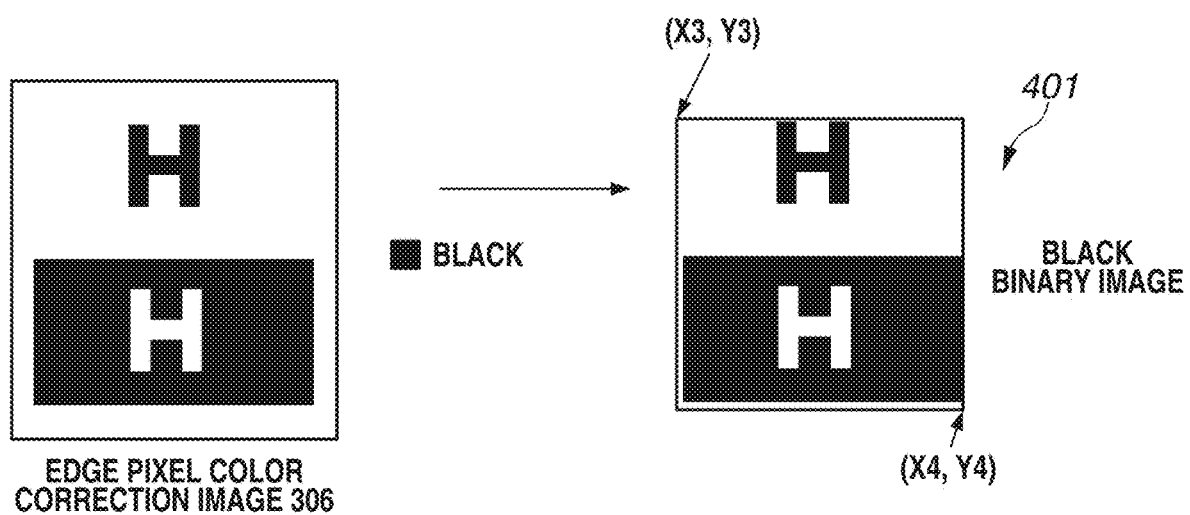
FIG. 4 is a diagram illustrating processing by a binary image generation unit according to the first exemplary embodiment.

A binary image generation unit 312 will be described with reference to FIG. 4. The binary image generation unit 312 generates a binary image 313 for each color, based on the edge pixel color correction image 306 and the sorted color information 318. In the present exemplary embodiment, the binary image generation unit 312 generates a binary image for each color except for the top color (white in the description of the present exemplary embodiment) of the sorted color information 318. For example, in a case where the value of the color included in the color information is black, an image size is set in which the coordinates of the pixel at the upper left corner of this color information in the edge pixel color correction image 306 is the upper left vertex of the binary image, and the coordinates of the pixel at the lower right corner is the lower right vertex of the binary image, as represented by data 401 in FIG. 4. Subsequently, assuming 1 if the pixel is a pixel having the same color as this color and 0 otherwise, the binary image generation unit 312 generates the binary image and adds the data indicating this color. The binary image compression unit 314 compresses the binary image 313 generated for each color in the binary image generation unit 312, and generates binary image compressed data 315. In the present exemplary embodiment, a Modified Modified READ (MMR) compression scheme is used, but the compression is not limited thereto. A data combining unit 316 combines the background color data 311, the binary image compressed data 315, and the sorted color information 318, thereby creating the compressed data 317.

Description of Flowchart

Figure 5:
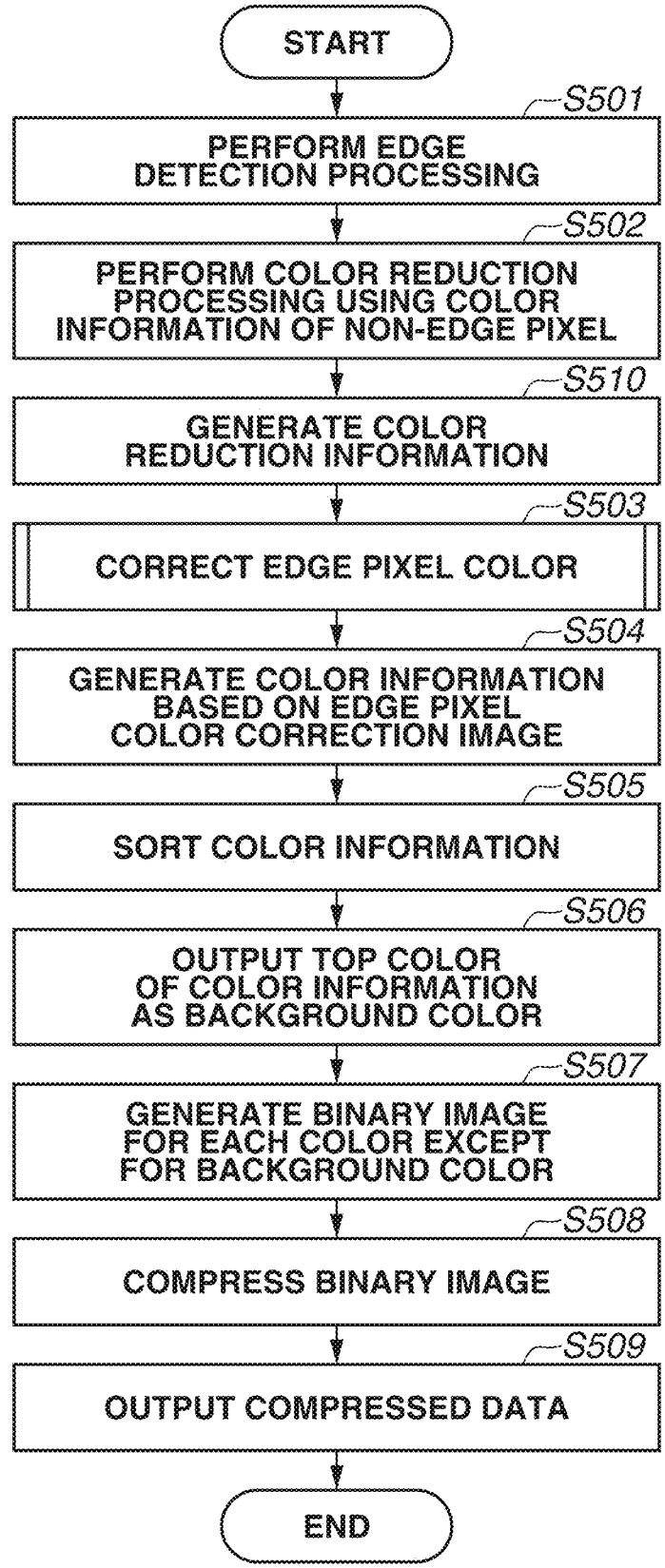
FIG. 5 is a flowchart of processing performed in the data processing unit according to the first exemplary embodiment.

Image encoding processing performed by the image encoding apparatus having the above-described configuration in the present exemplary embodiment will be described with reference to FIG. 5. FIG. 5 is a flowchart of the image encoding processing performed by the image encoding apparatus in the present exemplary embodiment. The description of each step in FIG. 5 is to describe the content of processing performed by each processing unit based on an instruction of the CPU 205.

When the user designates the small-number-of-colors compression using the operation unit 203 (FIG. 2) of the MFP 101 (FIG. 1), the operation unit I/F 207 notifies the CPU 205 of the data format designated by the user. The CPU 205 issues an instruction to execute document scanning by the scanner unit 201, based on the notification information from the operation unit I/F 207, and issues a processing start instruction for the input image data to the data processing unit 215. In response to the processing start instruction, in step S501, the edge detection unit 301 performs the edge detection processing for the input image, and generates the edge detection signal 302. As described above, a conventional technology is used for the detection method.

Next, in step S502, the color reduction processing unit 303 generates the reduced-color image 304 by performing the color reduction processing using color information of a pixel in which a value of the edge detection signal 302 is 0 (non-edge pixel), for the input image. The above-described method is used for the generation method.

Next, in step S510, using the original image and the reduced-color image 304 as input, the color reduction information generation unit 319 compares pixels at the corresponding positions of the respective images, and generates the color reduction information 320 indicating whether the color reduction is performed to make a change to a lower luminance or to a higher luminance. The color reduction information 320 is described above.

Description of Present Technology

Next, in step S503, using the edge detection signal 302, the reduced-color image 304, and the color reduction information 320 as input, the edge pixel color correction unit 305 corrects the color of the pixel subjected to the edge determination, based on the color reduction information and the colors of surrounding pixels.

Figure 7:
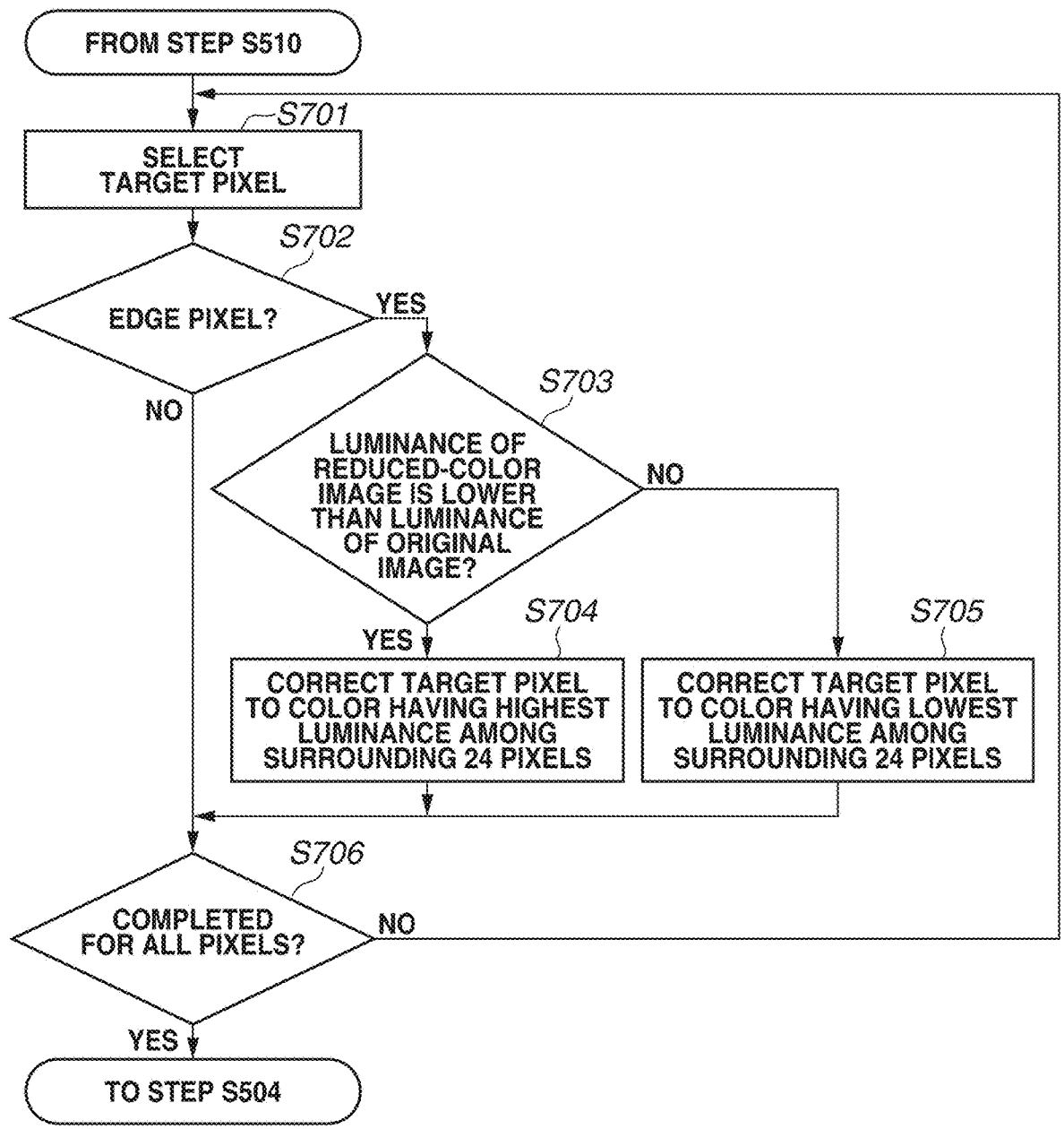
FIG. 7 is a flowchart of processing performed in an edge pixel color correction unit according to the first exemplary embodiment.

FIG. 7 is a flowchart illustrating the details of the processing in step S503 described above. The description of each step in FIG. 7 is to describe the content of processing performed by each processing unit based on an instruction of the CPU 205.

First, in step S701, the edge pixel color correction unit 305 selects the target pixel in the input image. In present exemplary embodiment, the selection is made in the raster scan order of the entire image.

Next, in step S702, the edge pixel color correction unit 305 determines whether the target pixel is an edge pixel, by referring to the edge detection signal 302 corresponding to the pixel selected in step S701.

If the target pixel is not an edge pixel (NO in step S702), i.e., the target pixel is a non-edge pixel, the processing proceeds to step S706. In step S706, the edge pixel color correction unit 305 determines whether the processing is completed for all the pixels.

If the target pixel is an edge pixel (YES in step S702), the processing proceeds to step S703. In step S703, referring to the color reduction information 320, the edge pixel color correction unit 305 determines whether the luminance of the reduced-color image is lower than that of the original image. If the luminance of the reduced-color image is determined to be lower (YES in step S703), the processing proceeds to step S704. In step S704, the edge pixel color correction unit 305 corrects the target pixel to a color having the highest luminance among the surrounding 24 pixels.

If the luminance of the reduced-color image is determined to be higher than or equal to that of the original image (NO in step S703), the processing proceeds to step S705. In step S705, the edge pixel color correction unit 305 corrects the target pixel to a color having the lowest luminance among the surrounding 24 pixels. In this way, for each edge pixel, the edge pixel color correction unit 305 determines whether a change to a lower luminance or a change to a higher luminance is made by the color reduction processing.

Next, in step S706, the edge pixel color correction unit 305 determines whether the processing is completed for all the pixels. If the processing is not completed (NO in step S706), the processing returns to step S701. If the processing is completed (YES in step S706), the processing proceeds to step S504.

The edge pixel color correction is thus performed in step S503.

Next, in step S504, the color information generation unit 307 in FIG. 3 generates the color information 308 based on the edge pixel color correction image 306. As described above, the color information 308 consists of the data indicating the color included in the edge pixel color correction image 306, the number of pixels for each reduced color, the coordinates of the uppermost left pixel in the edge pixel color correction image 306, and the coordinates of the lowermost right pixel therein.

Next, in step S505, the color information sorting unit 309 sorts the color information 308 by the number of pixels for each color, and generates the sorted color information 318. As a result of the sorting, the color information of the color corresponding to the largest number of pixels is at the top.

Next, in step S506, the background color data generation unit 310 outputs the value of the top color of the sorted color information 318, as the background color data 311.

Next, in step S507, the binary image generation unit 312 generates the binary image 313 for each color, using the color information 308 except for the top color and the edge pixel color correction image 306. For the generation method, the above-described method is used.

Next, in step S508, the binary image compression unit 314 compresses the binary image 313 for each color by a method such as MMR, and generates the binary image compressed data 315. The binary image compressed data 315 is a data group composed of color information and MMR compressed data.

Figure 8:
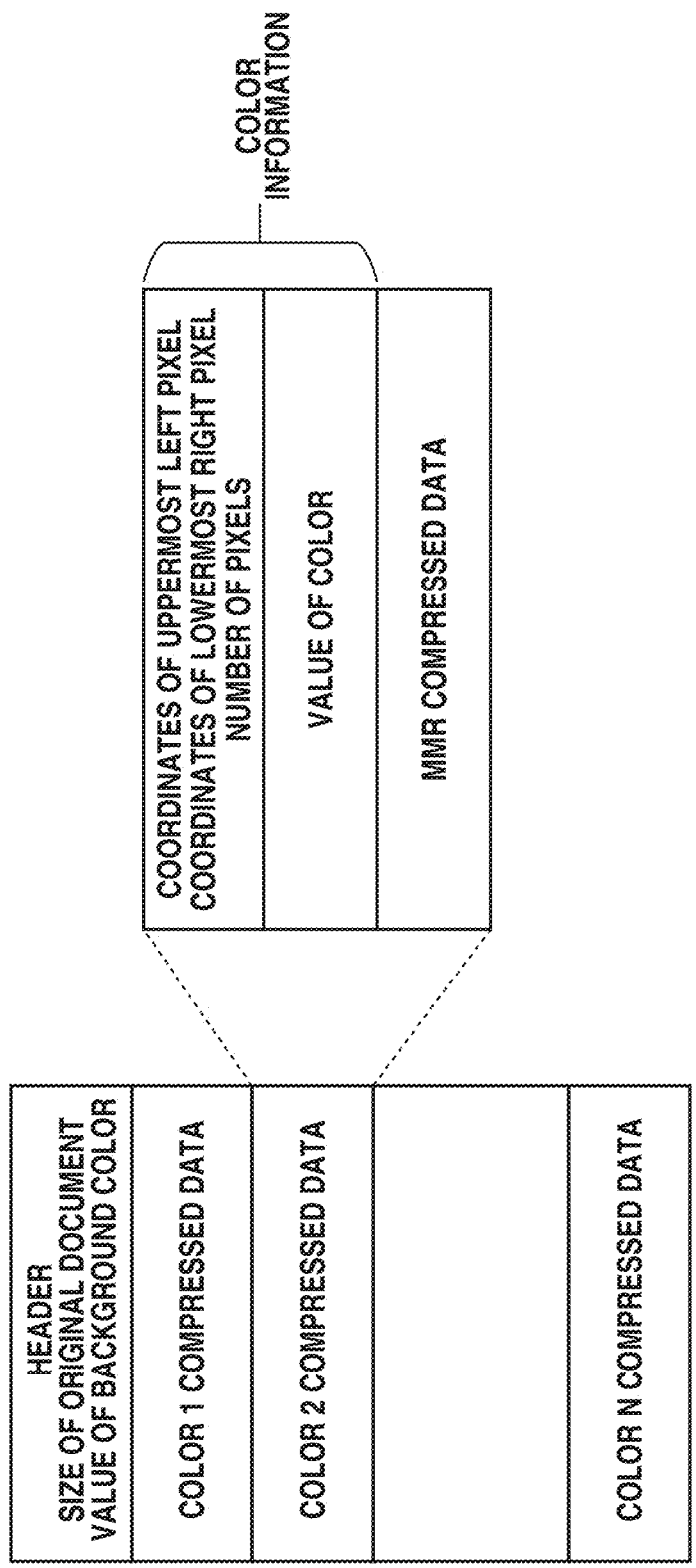
FIG. 8 is a diagram illustrating a configuration example of compressed data according to the first exemplary embodiment.

Finally, in step S509, the data combining unit 316 combines the background color data 311, the binary image compressed data 315, and the sorted color information 318, thereby creating the compressed data 317, and outputs the compressed data 317. FIG. 8 illustrates a configuration example of the compressed data 317.

First, information such as the size (the number of pixels in rows and columns) of the input document image (original image), the color value of the background color, and the resolution is included in a header. The color of the largest number of pixels is basically selected for the background color, and therefore, for example, in a case where the original document is printed on a color sheet such as a red sheet, a red-based color value is included. However, it is conceivable that the background is white in many cases, and therefore, in a case where white determination for the background color is performed, and if the background color is determined to be white, the value of the background color may be omitted. In the white determination, for example, in a case where each of RGB values is more than or equal to a fixed value and the difference between the values is within a fixed value, the background color is determined to be white.

The compressed data for each color follows the header. As described above, the compressed data is composed of the color information and the MMR compressed data. In a case where the number of colors remaining as a result of excluding the background color is N, the data having the same structures exists for that number of colors. As a matter of course, the data of this part is not created in a case where the input image is a monochromatic original document such as a blank sheet. In a case where the original document is a black-and-white document, the number of pieces of the color compressed data is 1, and the black-and-white document is substantially equal to a binary image. If a black pixel is present only in a part of the original document, only this part is compressed in the MMR compressed data, and therefore, the data size is smaller than in a case where the entire black-and-white document is subjected to the MMR compression.

The method of decompressing the compressed data 317 into the original image is as follows. The entire region of the original document is rendered with the background color stored in the header illustrated in FIG. 8, and the MMR compressed data included in the compressed data is sequentially decompressed in the stored order. Subsequently, using this image as a mask, overwriting is performed based on the stored position and color.

In this way, most of color document images can be efficiently compressed by having a binary image for each color.

As described above, based on the color reduction information indicating whether the color reduction is performed to make a change to a lower luminance or to a higher luminance, the color of the edge portion of each of the character and the reversed character is appropriately corrected, so that it is possible to improve the compression efficiency while maintaining the reproducibility of the character and the reversed character.

Description of Second Exemplary Embodiment

In the first exemplary embodiment described above, after the color reduction processing is completed in the color reduction processing unit 303, the original image and the reduced-color image 304 are input into the color reduction information generation unit 319, and the color reduction information generation unit 319 compares the pixels at the corresponding positions of the respective images, and generates the color reduction information 320.

However, the color reduction information 320 can be generated from the original image and the reduced-color image 304 at the time when the reduced-color image 304 is generated. Therefore, the color reduction processing unit 303 may be configured to generate the reduced-color image 304 and the color reduction information 320. In this case, the color reduction information generation unit 319 is unnecessary and thus a simpler configuration can be implemented.

Figure 11:
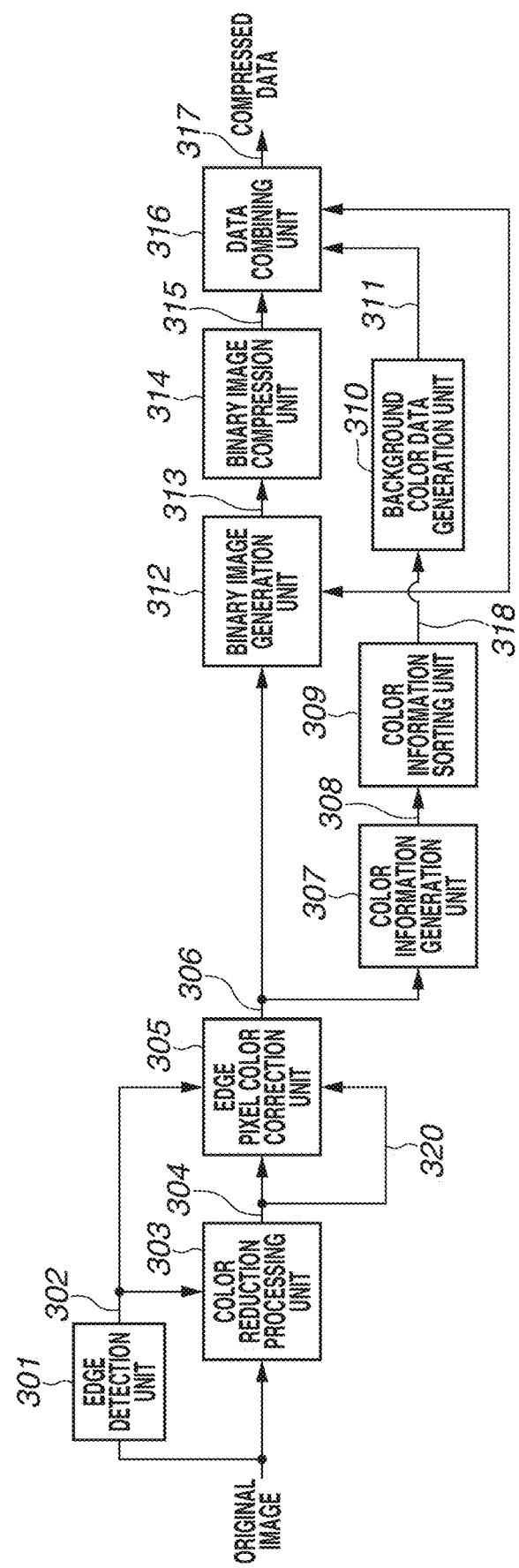
FIG. 11 is a diagram illustrating details of a data processing unit according to a second exemplary embodiment.

FIG. 11 is a block diagram of an image encoding apparatus according to a second exemplary embodiment. Here, the edge detection unit 301 to the sorted color information 318 and the color reduction information 320 are the same as those of the first exemplary embodiment and thus the description thereof will be omitted.

As described above, the color reduction processing unit 303 generates the color reduction information indicating whether the color reduction is performed to make a change to a lower luminance or to a higher luminance, so that a simpler configuration can be implemented.

Description of Third Exemplary Embodiment

In the first exemplary embodiment and the second exemplary embodiment described above, based on the original image and the reduced-color image 304, the pixels at the corresponding positions of the respective images are compared, and the color reduction information 320 indicating whether the color reduction is performed to make a change to a lower luminance or to a higher luminance is generated.

In a third exemplary embodiment, the edge detection unit 301 generates information to be used in place of the color reduction information 320, and this generation method will be described.

When the edge detection is performed in the edge detection unit 301, the original image and a predetermined threshold are compared, so that edge information indicating whether the pixel is an edge pixel having a low luminance or an edge pixel having a high luminance is obtained.

For example, in the edge pixel color correction unit 305, if the pixel is an edge pixel having a high luminance, a pixel having the lowest luminance value is selected from the surrounding pixels and the color of the pixel is corrected to the color of the selected pixel. If the pixel in the reduced-color image is an edge pixel having a lower luminance than that in the original image, a pixel having the highest luminance value is selected from the surrounding pixels and the color of the pixel is corrected to the color of the selected pixel.

Based on the edge information including the luminance information, the color of the edge pixel is corrected in the edge pixel color correction unit 305, so that the color of the edge portion of each of the character and the reversed character can be appropriately corrected.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-133793, filed Aug. 6, 2020, which is hereby incorporated by reference herein in its entirety.

What is claimed is:

1. An apparatus comprising:
a scanner that scans an image of an original document and generates image data; and
one or more controllers that:
execute color reduction processing of quantizing color of the generated image data;
execute an edge detection process for detecting one or more edge pixels indicating an edge portion of an image based on the image data having the quantized color; and
convert a pixel value of an edge pixel detected by the edge detection process,
wherein, in a case where the pixel value of the edge pixel which has been detected by the edge detection process is converted from a first pixel value to a second pixel value of which a luminance is lower than a luminance of the first pixel value by the color reduction processing, the one or more controllers convert the pixel value of the edge pixel which has been detected by the edge detection process to a pixel value of a pixel having a highest luminance among pixels surrounding the edge pixel which has been detected by the edge detection process, and
wherein, in a case where the pixel value of the edge pixel which has been detected by the edge detection process is converted from the first pixel value to a third pixel value of which a luminance is higher than the luminance of the first pixel value by the color reduction processing, the one or more controllers convert the pixel value of the edge pixel which has been detected by the edge detection process to a pixel value of a pixel having a lowest luminance among the pixels surrounding the edge pixel which has been detected by the edge detection process.

2. The apparatus according to claim 1, wherein the one or more controllers determine, for each of the detected one or more edge pixels indicating the edge portion of the image based on the image data having the quantized color, whether a conversion to a lower luminance or a conversion to a higher luminance is made by the color reduction processing.

3. The apparatus according to claim 2, wherein the one or more controller perform determination by comparing a pixel value of an edge pixel indicating an edge portion of an image based on image data before the color reduction processing is executed, and a pixel value of the detected edge pixel indicating an edge portion of an image based on image data after the color reduction processing is executed.

4. The apparatus according to claim 1, further comprising a transmitter,
wherein the one or more controllers compress the image data in which the pixel value of the detected edge pixel is converted, and
wherein the transmitter transmits the compressed image data.

5. The apparatus according to claim 4, wherein the one or more controllers compress the image data, using a Modified Modified READ (MMR) scheme.

6. The apparatus according to claim 1, wherein, in a case where the pixel value of the detected edge pixel is a converted from the first pixel value to the second pixel value by the color reduction processing, the one or more controllers convert the pixel value of the detected edge pixel to a pixel value of a pixel having a highest luminance among 5 x 5 pixels except for the detected edge pixel at center, and
wherein, in a case where the pixel value of the detected edge pixel is converted from the first pixel value to the third pixel value by the color reduction processing to increase the luminance, the one or more controller convert the pixel value of the detected edge pixel to a pixel value of a pixel having a lowest luminance among the 5×5 pixels except for the detected edge pixel at center.

7. A method comprising:
scanning an image of an original document and generating image data;
executing color reduction processing of quantizing color of the generated image data; and
executing an edge detection process for detecting one or more edge pixels indicating an edge portion of an image based on the image data having the quantized color,
converting a pixel value of an edge pixel detected by the edge detection process,
wherein, in a case where the pixel value of the edge pixel which has been detected by the edge detection process is converted from a first pixel value to a second pixel value of which a luminance is lower than a luminance of the first pixel value by the color reduction processing, the pixel value of the edge pixel which has been detected by the edge detection process is converted to a pixel value of a pixel having a highest luminance among pixels surrounding the detected edge pixel, and
wherein, in a case where the pixel value of the edge pixel which has been detected by the edge detection process is converted from the first pixel value to a third pixel value of which a luminance is higher than the luminance of the first pixel value by the color reduction processing, the pixel value of the edge pixel which has been detected by the edge detection process is converted to a pixel value of a pixel having a lowest luminance among the pixels surrounding the edge pixel which has been detected by the edge detection process.

8. The method according to claim 7, further comprising determining, for each of the detected one or more edge pixels indicating the edge portion of the image based on the image data having the quantized color, whether a conversion to a lower luminance or a conversion to a higher luminance is made by the color reduction processing.

9. The method according to claim 8, wherein the determining performs determination by comparing a pixel value of an edge pixel indicating an edge portion of an image based on image data before the color reduction processing is executed, and a pixel value of an edge pixel indicating the detected edge portion of an image based on image data after the color reduction processing is executed.

10. The method according to claim 7, further comprising:
compressing the image data in which the pixel value of the detected edge pixel is converted; and
transmitting the compressed image data.

11. The method according to claim 10, wherein the compressing compresses the image data, using a Modified Modified READ (MMR) scheme.

12. The method according to claim 7,
wherein, in a case where the pixel value of the detected edge pixel is converted from the first pixel value to the second pixel value by the color reduction processing, the converting converts the pixel value of the detected edge pixel to a pixel value of a pixel having a highest luminance among 5×5 pixels except for the detected edge pixel at center, and
wherein, in a case where the pixel value of the detected edge pixel is converted from the first pixel value to the third pixel value by the color reduction processing to increase the luminance, the converting converts the pixel value of the detected edge pixel to a pixel value of a pixel having a lowest luminance among the 5×5 pixels except for the detected edge pixel at center.

13. A non-transitory computer-readable storage medium storing a program that, when executed by a computer, causes the computer to perform a method of controlling an image processing apparatus, the method comprising:
scanning an image of an original document and generating image data;
executing color reduction processing of quantizing color of the generated image data; and
executing an edge detection process for detecting one or more edge pixels indicating an edge portion of an image based on the image data having the quantized color,
converting a pixel value of an edge pixel detected by the edge detection process,
wherein, in a case where the pixel value of the edge pixel which has been detected by the edge detection process is converted from a first pixel value to a second pixel value of which a luminance is lower than a luminance of the first pixel value by the color reduction processing, the pixel value of the edge pixel which has been detected by the edge detection process is converted to a pixel value of a pixel having a highest luminance among pixels surrounding the detected edge pixel, and
wherein, in a case where the pixel value of the edge pixel which has been detected by the edge detection process is converted from the first pixel value to a third pixel value of which a luminance is higher than the luminance of the first pixel value by the color reduction processing, the pixel value of the edge pixel which has been detected by the edge detection process is converted to a pixel value of a pixel having a lowest luminance among the pixels surrounding the edge pixel which has been detected by the edge detection process.

14. The non-transitory computer-readable storage medium according to claim 13, further comprising determining, for each of the detected one or more edge pixels indicating the edge portion of the image based on the image data having the quantized color, whether a conversion to a lower luminance or a conversion to a higher luminance is made by the color reduction processing.

15. The non-transitory computer-readable storage medium according to claim 14, wherein the determining performs determination by comparing a pixel value of an edge pixel indicating an edge portion of an image based on image data before the color reduction processing is executed, and a pixel value of an edge pixel indicating the detected edge portion of an image based on image data after the color reduction processing is executed.

16. The non-transitory computer-readable storage medium according to claim 13, further comprising:
compressing the image data in which the pixel value of the detected edge pixel is converted; and
transmitting the compressed image data compressed by the compressing.

17. The non-transitory computer-readable storage medium according to claim 16, wherein the compressing compresses the image data, using a Modified Modified READ (MMR) scheme.

18. The non-transitory computer-readable storage medium according to claim 13,
wherein, in a case where the pixel value of the detected edge pixel is converted from the first pixel value to the second pixel value by the color reduction processing, the converting converts the pixel value of the detected edge pixel to a pixel value of a pixel having a highest luminance among 5×5 pixels except for the detected edge pixel at center, and wherein, in a case where the pixel value of the detected edge pixel is converted from the first pixel value to the third pixel value by the color reduction processing to increase the luminance, the converting converts the pixel value of the detected edge pixel to a pixel value of a pixel having a lowest luminance among the 5×5 pixels except for the detected edge pixel at center.

* * * * *